United States Patent [19]
McGuire et al.

[11] Patent Number: 5,105,085
[45] Date of Patent: Apr. 14, 1992

[54] FLUID ANALYSIS SYSTEM

[76] Inventors: Danny G. McGuire, 1205 W. Beech, Duncan, Okla. 73533; Denver C. McGuire, P.O. Box 1126, Roland, Okla. 74954; Mark E. Sudberry, 2020 Gatlin, Duncan, Okla. 73533

[21] Appl. No.: 533,194

[22] Filed: Jun. 4, 1990

Related U.S. Application Data

[63] Continuation-in-part of Ser. No. 438,583, Nov. 17, 1989, Pat. No. 5,035,581.

[51] Int. Cl.$^5$ .............................. G01N 21/59
[52] U.S. Cl. .................... 250/343; 250/346; 356/436
[58] Field of Search ............... 250/343, 345, 346, 344; 356/436

[56] References Cited

U.S. PATENT DOCUMENTS

| | | | |
|---|---|---|---|
| 2,697,196 | 12/1954 | Harper | 318/482 |
| 2,947,931 | 8/1960 | Hubby | 318/447 |
| 3,075,466 | 1/1963 | Agnew et al. | 103/25 |
| 3,105,443 | 10/1963 | Johnson | 103/12 |
| 3,377,537 | 4/1968 | Brailsford | 318/444 |
| 3,741,683 | 6/1973 | McTamaney et al. | 417/7 |
| 3,800,205 | 3/1974 | Zalar | 318/482 |
| 3,969,941 | 7/1976 | Rapp | 73/290 R |
| 4,103,162 | 7/1978 | Iwamoto et al. | 250/343 |
| 4,628,204 | 12/1986 | Maes | 250/343 |
| 4,678,403 | 7/1987 | Rudy et al. | 417/12 |
| 4,688,943 | 8/1987 | Modarress | 356/436 |
| 4,940,900 | 7/1990 | Lambert | 250/343 |

FOREIGN PATENT DOCUMENTS 2217838 11/1989 United Kingdom ............... 250/343

Primary Examiner—Janice A. Howell
Assistant Examiner—Richard Hanig
Attorney, Agent, or Firm—Dunlap, Codding & Lee

[57] ABSTRACT

A system for analyzing fluids. In one embodiment, the system measures the water content in an oil/water emulsion. A fluid probe comprising an infrared light emitting diode and a phototransistor measures the opacity of the fluid. The signal from the phototransistor is input into a series of potentiometers which are set to correspond to different percentages of water content. The outputs of the potentiometers are displayed by a light emitting diode panel. Means for automatically recalibrating the system in response to temperature changes is included. Further, means is included for recalibrating the system to operate in fluids having different API gravities.

In a second embodiment, the system analyzes a fluid to identify and differentiate different fluids in a mixture. The system can distinguish between petroleum products having different opacities; that is, the system can differentiate between crude oil, light oil and distillate. Still further, the system can differentiate between conductive fluids, such as water, and non-conductive fluids, such as oil. An infrared light emitting diode and a phototransistor in a fluid probe output a signal indicating by the voltage level the opacity of the fluid. A pair of conductive pins in the fluid probe sense the conductivity of the fluid. The signals from the phototransistor and the conductive pins are input into a series of comparators which are set to preselected levels corresponding to different opacities. The outputs of the comparators are displayed by a light emitting diode panel.

33 Claims, 2 Drawing Sheets

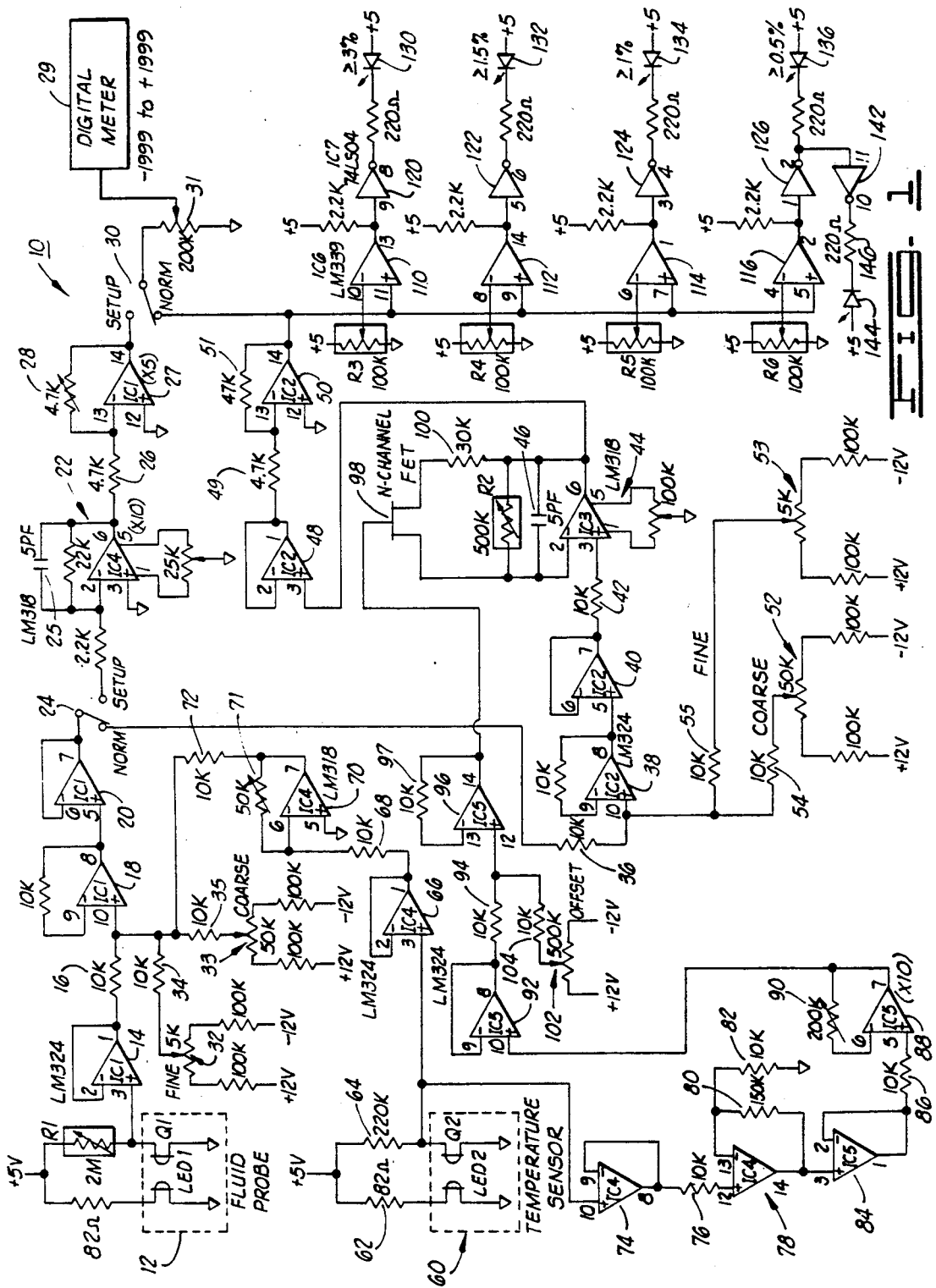

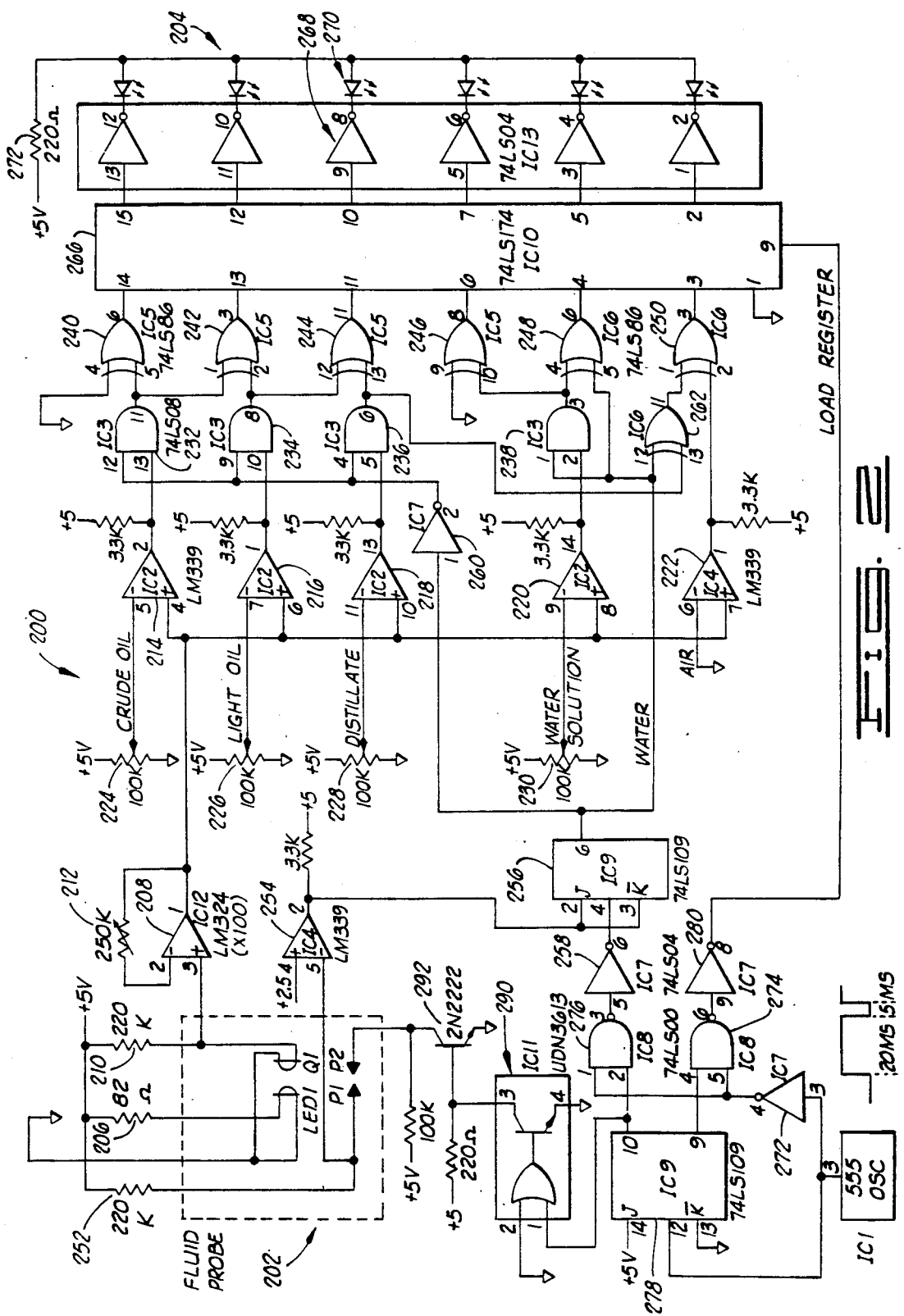

FLUID ANALYSIS SYSTEM

This application is a continuation-in-part of U.S. application Ser. No. 07/438,583, entitled FLUID LEVEL MONITORING AND CONTROL SYSTEM, filed Nov. 17, 1989, now U.S. Pat. No. 5,035,581. The contents of this prior application are incorporated herein by reference.

FIELD OF THE INVENTION

The present invention relates generally to devices for analyzing fluids and more particularly to devices for determining the water content of an oil/water emulsion and for differentiating between types of fluids having different capacities for transmitting infrared light and including non-conductive and conductive fluids.

SUMMARY OF THE INVENTION

The present invention comprises a system for analyzing fluid. The system comprises opacity detection means for detecting the opacity of the fluid and for producing a signal indicative of the opacity of the fluid. A signal differentiation means is included for receiving the signal produced by the opacity detection means and in response thereto producing one of a plurality of signals, each such signal corresponding to a different one of a plurality of preselected opacities. In this way, the opacity of the fluid can be determined. Still further, the system comprises means for transforming the signals from the signal differentiation means into a humanly perceivable form means for calibrating the system in response to changes in temperature.

The present invention further comprises a system for analyzing fluids which system comprises opacity detection means for detecting the opacity of the fluid and for producing a signal indicative of the opacity of the fluid. The system further comprises signal differentiation means for receiving the signal produced by the opacity detection means and in response thereto producing one of a plurality of signals, each such signal corresponding to a different one of a plurality of selected opacities, wherein each of the opacities are selected to correspond to a different one of a plurality of preselected fluid types. Still further, the system comprises means for transforming the signals from the opacity detection means into a humanly perceivable form.

The present invention further comprises a fluid analysis system comprising opacity detection means for detecting the opacity of the fluid and for producing a signal indicative of the opacity of the fluid. Also included in the system is conductivity sensing means for sensing if the fluid is electrically conductive and for producing a signal indicative of the conductivity of the fluid. Still further, the system comprises signal differentiation means for receiving the signals produced by the opacity detection means and the conductivity sensing means and in response thereto producing a plurality of signals, each such signal corresponding to a different one of a plurality of types of fluids, which fluid types include conductive and non-conductive fluids having different selected opacities. Finally, the system includes means for transforming the signals produced by the signal differentiation means into a humanly perceivable form.

BRIEF DESCRIPTION OF THE FIGURES

FIG. 1 is a schematic drawing of a first preferred embodiment of the fluid analysis system of the present invention.

FIG. 2 is a schematic drawing of a second preferred embodiment of the fluid analysis system of the present invention.

DETAILED DESCRIPTION OF THE PREFERRED EMBODIMENTS

The product of an oil well typically comprises crude oil mixed with varying amounts of water forming an oil/water emulsion. An oil product that comprises 0.5 percent or less water is considered pure oil under present industry standards. An oil product that contains more than 0.5 percent water must be treated for the removal of water.

Heretofore, a "grind-out" machine comprising a centrifuge has been used to determine the water content of oil. A sample of the oil product from each of several depths in the vessel or storage tank is removed and tested. This procedure is time consuming and expensive.

In addition to crude oil and water, the product of an oil well often contains a combination of other petroleum products, such as light oil, and distillate. The mixture also may contain muddy water. Because of the difference in weights of these various fluids, they will settle in layers in a vessel containing such a mixture.

Separation of the fluids is accomplished by draining the heaviest fluid from the bottom of the vessel. This procedure is difficult and inaccurate because the operator lacks information as to the volume and location of each layer of fluid. For example, when water at the bottom of a tank is being drained, the operator simply watches the fluid until it shows oil and then stops.

In one embodiment, the present invention provides a device which can be used to determine the percentage of water in an oil/water emulsion. In another embodiment of the present invention, the device differentiates and identifies different fluids in such a heterogenous solution. Thus, this invention makes possible a relatively precise determination of the dividing lines between layers of different fluids. In this way, it is possible to determine the volume and location of each type of fluid in a vessel.

The device of this invention is portable and can be used to test the oil product at any location and in virtually any vessel in which the oil product has been collected after removal from the well. There is no need for preparation of an oil product sample prior to analysis. The device can be used in any oil mixture, regardless of the presence of other fluids or contaminants. Still further, because the device utilizes low voltage, high resistance, low current components it is relatively safe to operate. Other advantages and features of this invention will be apparent from the following description.

The present invention is particularly useful in the petroleum industry. However, it will be appreciated that this invention has many other applications, including analysis of paints, consumable liquids, cooking oils, and the like.

THE EMBODIMENT OF FIG. 1

With reference now to FIG. 1, there is shown therein a first embodiment of a fluid analysis system constructed in accordance with the present invention. In this embodiment, the system analyses an oil/water emulsion. The system is designated generally by the reference numeral 10.

The system 10 comprises a fluid probe 12 for detecting the opacity of a fluid and for producing a signal indicative of the opacity of the fluid. As used herein, "opacity" refers to the relative capacity of a fluid to obstruct the transmission of light.

Preferably, the fluid probe 12 comprises a device capable of detecting the capacity of the fluid to transmit infrared light. To this end, a first infrared light emitting diode "LED1" and an opposing phototransistor "Q1" are provided. The probe 12 is adapted for submersion in the fluid to be analyzed. These may be mounted using epoxy in a small piece of perforated plastic pipe about ¼ inch in diameter.

A constant +5 volts from a direct current power source (not shown), such as regulated power supply, is input to one terminal of the infrared light emitting diode LED 1 across an 82 Ohm fixed resistor. The other terminal of the infrared light emitting diode LED 1 is connected to ground.

A constant +5 volts also is input into the phototransistor Q1 across a high value resistor, such as the 2M variable resistor R1. It is desirable to use a "plug in" card containing this resistor and other resistors, as will be described. In this way, the system 10 may be provided with a set of interchangeable resistors of different values to accommodate fluids of different gravities, and more particularly oils having different API gravities.

The difference between the voltage emitted from Q1 in emulsions comprising different percentages of water is very small. For this reason, the signal output from the phototransistor Q1 is amplified and the excess voltage is offset. Specifically, the signal output from Q1 is input to an isolation amplifier 14, preferably in an LM324 chip designated herein as IC1.

The signal output from the amplifier 14 is fed through a 10K fixed resistor 16 through a second and third amplifier 18 and 20, also in IC1. The signal output from the third amplifier 20 is input to another amplifier 22, and a first switch 24 is interposed therebetween. The switch 24 is operable between a normal or operating position, "NORM", and an adjustment or "SETUP" position.

The amplifier 22 is a high gain amplifier as in a LM318 chip, referred to herein as IC4. The gain of this amplifier should be set at about 10. A 5 pF capacitor 25 creates a feedback loop to the amplifier 22 to prevent the amplifier from going into oscillation.

The signal output from the amplifier 22 is input through a 4.7K fixed resistor 26 to another amplifier 27 also in IC1. A 4.7K variable resistor 28 is included for setting the gain on the amplifier 27, which preferably is about 5.

The signal output from the amplifier 27 is input to a digital meter 29. Preferably, the digital meter 29 has a range of −1999 to +1999. Another switch 30 is interposed between the amplifier 27 and the digital meter 29. Like the switch 24, the switch 30 is operable between a "NORM" position and a "SETUP" position. A 200K potentiometer 31 is interposed between the digital meter 29 and the switch 30 to scale the voltage to the meter.

For fine adjustment of the readout on the digital meter 29, a 5K potentiometer 32 is included. For coarse adjustment a 50K potentiometer 33 is employed. The 5K potentiometer 32 receives the signal from Q1 through a 10K fixed resistor 34 which is interposed between the resistor 16 and the amplifier 18. The 50K potentiometer 33 receives the signal from Q1 through another 10K fixed resistor 35, interposed at the same point. Thus, when the switches 24 and 30 are in the "SETUP" position, the signal input to the digital meter 29 from Q1 can be adjusted to a desired midrange, such as 800.

When the first switch 24 is in the "NORM" position, the signal from Q1 is conducted through a 10K fixed resistor 36 to another amplifier 38, preferably in another LM324 chip designated herein as IC2. The signal output from the amplifier 38 is input to an amplifier 40, also in IC2, and then across another 10K fixed resistor 42 to a high gain amplifier 44, preferably an LM318 chip designated herein as IC3.

The gain of the amplifier 44 is set by adjusting a 500K variable resistor R2. As indicated previously, it is desirable for this resistor to be in a "plug in" card interchangeable with other resistors for accommodating different grades of oil. Oscillation of the amplifier 44 is avoided by the 5 pF comparator 46, which sets up a feedback loop.

The signal output from the amplifier 44 is input into the amplifier 48 (IC2), then across a 4.7K fixed resistor 49 into an amplifier 50 (IC2). A 47K fixed resistor 51 is interposed between the signal path entering the amplifier 50 and the signal path exiting the amplifier 50. The output from the amplifier 50 is conducted to the digital meter 29, when the second switch 30 is in the "NORM" position, and simultaneously to a light emitting diode panel, yet to be described.

As indicated previously, the system 10 may be used to analyze emulsions comprising oils having different API gravities, and the conductance of emulsions of different grades of oil having the same percentage of water varies significantly. Thus, the system 10 preferably comprises a mechanism for adjusting for this difference between grades of oil. The gravity adjustment component has a coarse and fine adjustment comprising a 50K potentiometer 52 and a 5K potentiometer 53 interposed in the signal path before the signal is input to the amplifier 38. A 10K fixed resistor 54 is interposed in the signal path between the 50K potentiometer 52 and the amplifier 38. Similarly, a 10K fixed resistor 55 is interposed between the 5K potentiometer 53 and the amplifier 38.

As the temperature of the fluid changes, the conductivity of the fluid changes. More specifically, as the temperature of the fluid increases, the conductivity of the fluid increases. Conversely, as the temperature of the fluid decreases, the conductivity of the fluid decreases. Consequently, if the temperature changes, the readings of the system 10 calibrated at a different temperature will not be accurate. Therefore, it is advantageous to provide the system 10 with a feature for recalibrating the system in response to changes in temperature. Most preferably, the temperature recalibration feature is one which functions automatically.

To this end, the system 10 preferably further comprises a temperature sensor 60. The sensor 60, like the fluid probe 12, may comprise a second infrared light emitting diode "LED2" and a second opposing phototransistor "Q2". These are mounted, by epoxy for example, inside a sealable container (not shown), such as a length of ⅜ pipe. The container is filled with a sample of the pure fluid (less than 0.5% water) and supported near the fluid probe 12. Thus, a change in the temperature in the surrounding fluid will result in a concomitant change in the temperature in the fluid sample in the temperature sensor 60.

A constant +5 volts of direct current is input across an 82 Ohm fixed resistor 62 to one of the terminals of the infrared light emitting diode LED2, the other terminal being connected to ground. A constant +5 volts likewise is input into the phototransistor Q2 across a 220K fixed resistor 64.

The signal output from the phototransistor Q2 is input into an amplifier 66, preferably in an LM324 chip (IC4). The output of the amplifier 66 is input through a 10K fixed resistor 68 into another amplifier 70. The gain of the amplifier 70 is set by a 50K variable resistor 71. The output of the amplifier 70 passes through a 10K fixed resistor 72 and then intercepts the signal path from the phototransistor Q1 in the fluid probe 12 as it enters the amplifier 18. Thus, when the temperature in the sensor 60 changes, the voltage of the signal output by the phototransistor Q2 will change. This difference in voltage is reflected in the input of the signal into the amplifier 18 which sums the signals from the temperature sensor 60, the amplifier 14 (from Q1), the 5K potentiometer 32 (fine adjustment), and the 50K potentiometer 33 (coarse adjustment).

The signal from the second phototransistor Q2 in the temperature sensor 60 simultaneously is conducted through a high gain amplifier 74 (IC4), across a 10K fixed resistor 76 and to an amplifier 78. A 150K fixed resistor 80 is interposed between the negative terminal of the amplifier 78 and the output signal, and the resistor 80 is connected to through a 10K resistor 82 to ground. This establishes the gain of the amplifier.

The signal output from the amplifier 78 is input into another high gain amplifier 84 (IC5), conducted across a 10K fixed resistor 86 and input into a high gain amplifier 88 (IC5), having a gain set at about 10. The gain of the amplifier 88 is set by a 200K variable resistor 90.

The output signal of the amplifier 88 is input into an amplifier 92 (IC5), across a 10K fixed resistor 94 and into an amplifier 96. A 10K fixed resistor 97 establishes a gain of 1. The output of the amplifier 96 is input into an N-CHANNEL FET 98, which controls the gain of the amplifier 44 and serves to offset the effect of temperature changes in the fluid being tested. A 30K fixed resistor 100 establishes the maximum feedback or minimum gain.

To maintain the signal from the amplifier 96 in a voltage range which is suitable for the N-CHANNEL FET 98, an offset is accomplished by a 50K potentiometer 102 interposed between the resistor 94 and the amplifier 96. The signal output by the potentiometer 102 is conducted through the 10K fixed resistor 104 and is summed with the signal input into the amplifier 96.

The signal from the amplifier 50 is input to a device which will output a plurality of signals, each such signal corresponding to a different one of a plurality of preselected opacities. Preferably, the signals are selected to correspond to different levels of water content in the fluid.

In the preferred embodiment, the system includes a series of comparators, preferably in a LM339 chip designated herein as IC6. Each of the comparators receives the signal produced by the phototransistor Q1 and compares it to the signal generated by a potentiometer. Each potentiometer is preset to a selected voltage which corresponds to an emulsion having a known percentage of water. It will be understood that different percentages may be selected depending on the intended use. In the embodiment described, the selected percentages are 0.5%, 1.0%, 1.5% and 3.0%.

Accordingly, the comparators 110, 112, 114 and 116 are set by 100K potentiometers R3, R4, R5 and R6, respectively. It will be appreciated that the potentiometers R3-R6 may be incorporated into a plug-in card with the resistors R1 and R2, previously described. In this way, all the potentiometers may be changed conveniently when the system is to be used to analyze a fluid having a different gravity.

The outputs of the comparators 110, 112, 114 and 116 are inverted by inverters 120, 122, 124 and 126 which may be in a 74LS04 chip, designated herein as IC7. A +5 volts is input into each inverter across a 2.2K fixed resistor. The signals output by the inverters 120, 122, 124 and 126 are input across 220 Ohm fixed resistors into light emitting diodes ("LED") 130, 132, 134 and 136, respectively, which display the signals in a humanly perceivable form.

Thus, for example, if the signal from the probe 12 is less than the voltage at which the comparator 116 is set, the comparator 116 will output 0 volts. The inverter 126 will output +5 volts, and the LED 136 will remain off. If the signal from the fluid probe 12 exceeds the voltage at which the comparator 116 is set (by adjusting R6), the comparator will output 5 volts, the inverter 126 will output 0 volts, and the LED 136 will be lit.

If the signal from the probe 12 exceeds the voltage level at which the comparator 114 is set but is less than the voltage of the comparator 112, the LED 134 also will light. If the voltage of the fluid probe signal exceeds the voltage at which the highest comparator 110 is set, all the LED's 130, 132, 134 and 136 will light.

On the other hand, if the signal output by the fluid probe 12 is less than the lowest voltage set on the comparators, none of the LED's will light. To verify that a signal is being transmitted, it is desirable to include an LED 140 that will be activated when the fluid being tested is pure, that is contains water at or below a selected level.

To this end, the signal output by the inverter 126 is input to another inverter 142 and then into another LED 144 across a 220 Ohm fixed resistor 146. Thus, if the signal output by the inverter 126 is +5 volts, so that the LED 136 does not light, the LED 144 will light. It is preferable to employ a different color of LED for the LED which indicates a pure fluid (less than the minimum percentage of water). For example, the "clear" LED 144 may be green and the other LED's 130, 132, 134 and 136 may be red.

In operation, the system first is calibrated by adjusting the digital meter 29 to read about 800 when the fluid probe 12 is contacted with a water-free (less than 0.5%) sample taken from the fluid to be analyzed. If necessary, the potentiometers R1-R6 are changed out to adjust the system for a fluid having a different gravity.

Having calibrated the system, the fluid probe 12 along with the temperature probe 60 are immersed in the fluid. Due to the tendency of water in an oil/water emulsion to settle at the bottom of a vessel, the emulsion at the top of the vessel may have a significantly lower water content. For this reason, it may be desirable to analyze the body of fluid at several levels in the vessel. If indicated, the emulsion may be treated for removal of water. Then, the fluid may be tested again to determine if further treatment is necessary.

THE EMBODIMENT OF FIG. 2

Turning now to FIG. 2, there is shown therein a second embodiment of a fluid analysis system in accordance with the present invention. This system, designated generally by the reference numeral 200, can be used to identify and differentiate between different fluids in a heterogenous mixture. For example, the system can differentiate between conductive fluids, such as water, and nonconductive fluids, such as oil. Further, the system can differentiate between clear or muddy water and between different grades of oil.

The system 200 comprises a fluid probe 202 for detecting the opacity of the fluid and for producing a signal indicative of the opacity of the fluid. To this end, the fluid probe 202 is equipped with an infrared light emitting diode LED1 and an opposing phototransistor Q1. LED1 and Q1 detect the opacity of the fluid by detecting the capacity of the fluid to transmit infrared light. Thus, the signal from the probe 202 can be used to differentiate between crude oil and distillate, for example, and between muddy water and clear water.

The probe 202 further preferably comprises a device for sensing if the fluid is electrically conductive and for producing a signal indicative of the electrical conductivity of the fluid. Thus, the probe 202 further comprises a pair of opposing conductive pins P1 and P2 supported near the LED1 and Q1. The pins P1 and P2 test for whether the fluid is conductive, such as water, or nonconductive, such as oil.

The outputs of the phototransistor Q1 and the conductive pin P1 are read by means of light emitting diodes, designated herein collectively by the reference numeral 204 and described hereafter in more detail. Each of the diodes 204 corresponds to a different type of fluid for which analysis is being made. In the embodiment described, the system 200 will detect the presence of six different fluids, namely crude oil, light oil, distillate, muddy water, clear water and air. However, it will be appreciated that the types of fluid detectable by the system can be varied.

Turning first to the circuit by which the output of the phototransistor Q1 is conducted to the light emitting diodes 204, one terminal of LED1 is connected to ground. A +5 volts is input into the other terminal across an 82 Ohm fixed resistor 206. One terminal of Q1 is connected to ground, and the other terminal transmits the output of Q1 into an amplifier 208, such as in an LM324, designated herein as IC12. The greater the opacity of the fluid, or the less light that is received by the phototransistor Q1, the greater the voltage output by the phototransistor Q1.

A +5 volts is input into the amplifier 208 across a 220K fixed resistor 210. A 250K variable resistor 212 is used to set the gain of the amplifier 208. Preferably, the amplifier should increase the signal by a factor of about 100.

The signal from the amplifier 208, is transmitted to and received by a device, preferably comprising comparators. In response to the signal, the device produces a plurality of signals, each such signal corresponding to a different one of a plurality of selected opacities. Because different fluid types exhibit different degrees of opacity, the degree of opacity (which in this embodiment is indicated by different voltages from the amplifier 208) can be used to differentiate fluid types. Accordingly, as will be explained in more detail hereafter, the opacities preferably are selected to correspond to a different one of a plurality of preselected fluid types.

In the preferred embodiment, the output of the amplifier 208 is transmitted first to a plurality of comparators, such as in LM339 chips designated herein as IC2 and IC4. The number of comparators will depend on the variety of different types of fluids to be determined. In the embodiment shown, comparator 214 is set to test for crude oil, comparator 216 for light oil, comparator 218 for distillate, comparator 220 for a dark water solution (usually muddy water), and comparator 222 for air (or any completely transparent nonconductive fluid). As will be shown, no comparator is used in the signal path for clear water.

Each of the comparators 214, 216, 218 and 220 is set by a 100K potentiometer 224, 226, 228 and 230, respectively. To set the potentiometers, the probe 202 is immersed in a sample of the particular fluid. Then, the corresponding potentiometer is adjusted until the comparator outputs a "1". This is repeated with the probe 202 in a sample of each type of fluid.

Thus, in properly calibrated system, if the fluid is as dark (opaque) as crude oil, the voltage output of the amplifier 208 is greater than the voltage on the comparator with the highest voltage, comparator 214. Accordingly, each of the comparators 214, 216, 218, 220 and 222 will output a "1". If the fluid is as dark or darker than distillate, but not as dark as light oil, the comparators 218, 220 and 222 will output a "1", and the comparators 214 and 216 each will output a "0". Further, if the fluid is air, all the comparators 214, 216, 218, 220 and 222 will output a "0".

The negative terminal of the "air" comparator 222 is connected to ground so that it will output a "1" if any voltage greater than ground is input to the positive terminal.

The signals from the comparators 214 (crude oil), 216 (light oil), 218 (distillate) and 220 (muddy water) are input into an AND gate 232, 234, 236 and 238, respectively, such as in a 74LS08 chip, designated herein as IC3. A +5 volts is input into each AND gate across a 3.3K fixed resistor.

The signal from each of the AND gates 232, 234 and 236 is input into an exclusive OR gate 240, 242 and 244, such as in a 74LS86 chip, designated herein as IC5. The signal from the AND gate 232 is input into the OR gate 242, and the signal from the AND gate 234 is input into the OR gate 243. The signal output from the AND gate 238 is input into two exclusive OR gates 246 (IC5) and 248 (IC6).

The signal from the comparator 222 is input directly into an exclusive OR gate 250. A +5 volts is input into this signal path across a 3.3K fixed resistor.

As stated previously, the signal from the conductive pin P1 indicates whether the fluid is conductive or nonconductive. A +5 volts is input into P1 across a 220K fixed resistor 252. The signal from P1 is input into the negative terminal of an comparator 254, such as in an LM339 (IC4). A +2.5 volts is input into the positive terminal of the comparator 254.

As will be described hereafter, P2 is intermittently grounded. When P2 is grounded, the signal from P1 input in the comparator 254 will indicate whether the fluid is conductive or nonconductive. If the fluid is conductive, the voltage from P1 will be divided and the voltage input to the comparator 254 will be relatively low and less than the +2.5 volts at the positive terminal. Consequently, the output of the comparator 254 will be "1." Conversely, if the fluid is not conductive, the conductive pins P1 and P2 act as an open circuit and output from P1 is the entire +5 volts. Thus, in this instance the comparator 254 will output a "0."

The output of the comparator 254 is input into a flip-flop circuit 256, such as a 74LS109 chip, designated herein as IC9. The flip-flop circuit 256 is set by the signal from an inverter 258, yet to be described. The signal output by the flip-flop 256 is input into an inverter 260. The output of this inverter 260 is input into each of the AND gates 232, 234 and 236.

If the signal from the flip-flop 256 is "1" (indicating a conductive fluid), the signal from the inverter 260 will be "0". Thus the output of each of the AND gates 232, 234 and 236, which receive signals from the comparators 214, 216 and 218 (for crude oil, light oil and distillate), will be "0", regardless of the output of the comparators 232, 234 and 236.

On the other hand, when the signal output from the flip-flop 256 is "0" (indicating a nonconductive fluid, such as oil), the output of the inverter 260 will be "1". This permits the output of the comparators 214, 216 and 218 to control the output of the AND gates 232, 234 and 236.

The output of the flip-flop 256 also is input into an exclusive OR gate 262 (IC6). The other terminal of the exclusive OR gate 262 receives the output of the AND gate 236 (distillate). The output of the exclusive OR gate 262 is input to the exclusive OR gate 250 (IC6), which receives the signal from the comparator 222 (air).

In this way, if the fluid is conductive, the OR gate 262 will receive a "0" from the AND gate 236 and a "1" from the flip-flop 256 and therefore will output a "0". This "0" signal is input into the OR gate 250 which, in the case of a conductive fluid, is receiving a "1" from the comparator 222. Thus, the OR gate 250 will output a "0" in the case of conductive fluid. If the probe 202 is in air, the output of the OR gate 262 will be "1" and the output of the comparator 222 will be "0". Thus, the output of the gate 250 will be a "1".

The signal from the flip-flop 256 also is input into the AND gate 238 and the OR gate 248. Thus, if the fluid is conductive, a "1" will be input into each. As a result, if the fluid is dark (muddy), the AND gate 238 will output a "1", the OR gate 248 will output a "0", and the OR gate 246 will output a "1". If the conductive fluid is clear, the AND gate 238 will output a "0", the OR gate 248 will output a "1" and the OR gate 246 will output a "0".

The signals from the exclusive OR gates 240, 242, 244, 246, 248 and 250 are loaded into a data register 266, such as a 74LS174, designated herein as IC10. The signals output by the data register 266 are inverted in inverters, designated collectively herein as 268. A 74LS04 chip, designated herein as IC13, is suitable for this purpose.

The signals output by the inverters 268 are input to a series of light emitting diodes "LED", designated collectively by the reference numeral 270, by which the signals are transformed into a humanly perceivable form. A +5 volts is input into each of the diodes 270 across a 220 Ohm fixed resistor 272. It will be appreciated that only one resistor is required because only one LED will be illuminated at a time.

The signals from the OR gates 240, 242, 244, 246, 248 and 250 are loaded into the data register 266 by means of an oscillator "OSC", such as a 555 chip designated herein as IC1. The signal from the oscillator OSC is a biphasic 25 millisecond pulse, having a 20 millisecond phase and a 5 millisecond phase.

The signal from the oscillator OSC is inverted in an inverter 272, preferably in a 74LS04 chip designated herein as IC7. The output of the inverter 272 is input into two NAND gates 274 and 276, such as in a 74LS00 chip designated herein as IC8.

The pulse from the oscillator OSC operates a flip-flop circuit 278 (IC9). The flip-flop 278 outputs a signal to the NAND gates 274 and 276 through pins 9 and 10, respectively.

The signal from the NAND gate 274 is inverted in an inverter 280 (IC7). The output of the inverter 280 drives the loading of the data register 266. Thus, with every other 50 millisecond pulse of the oscillator OSC, the signals from the OR gates 240, 242, 244, 246, 248 and 250 are loaded into the data register 266.

The output of pin 10 of the flip-flop 278, which enables the NAND gate 276 also is input into an OR gate in a UDN3613 chip 290. This activates a transistor 292 which grounds conductive pin P2. This allows the conductive pins P1 and P2 to detect the presence of a conductive fluid. Then, as described previously, the comparator 254 (IC4) will output a "1" if the fluid is conductive and a "0" if the fluid is nonconductive. This signal will be output at pin 6 of the flip-flop 256, as it is set with the pulse from the oscillator OSC at the same time that P2 is grounded. The signal from the flip-flop 256 is input into the inverter 260, the AND gate 238 and the OR gates 248 and 262, as previously described. Thus, every other pulse of the oscillator OSC, alternating with the pulse which drives the loading of the data register 266, enables the conductive pins P1 and P2 to sense the presence of conductive fluid.

Now it will be appreciated that the fluid analysis system of this invention in accordance with the embodiment of FIG. 1 provides an inexpensive and simple means for determining the water content of an oil/water emulsion. In accordance with the embodiment of FIG. 2, the present invention makes possible the rapid and inexpensive detection of the presence of a variety of different fluids in a mixture of two or more fluids.

Because the system is portable it can be used at any location and the probe component can be inserted directly into the storage vessel containing the fluid to be tested. Results of the analysis are instantly available. The need for time consuming and expensive preparation of a treatment sample is eliminated.

Changes may be made in the combination and arrangement of the various parts, elements, steps and procedures described herein without departing from the spirit and scope of the invention as defined in the following claims.

We claim:

1. A system for analyzing fluid comprising:
   opacity detection means for detecting the opacity of the fluid and for producing a signal indicative of the opacity of the fluid;
   signal differentiation means for receiving the signal produced by the opacity detection means and in response thereto producing one of a plurality of signals, each such signal corresponding to a different one of a plurality of preselected opacities, whereby the opacity of the fluid can be determined;
   means for transforming the signals from the signal differentiation means into a humanly perceivable form; and
   means for recalibrating the system in response to changes in temperature.

2. The system of claim 1 wherein the temperature recalibration means is accomplished automatically.

3. The system of claim 1 wherein the opacity detection means comprises a source of infrared light, means for receiving the infrared light, and means for producing an electrical signal which varies depending on the opacity of the fluid.

4. The system of claim wherein the opacity detection means comprises an infrared light emitting diode and a phototransistor.

5. The system of claim 1 wherein the signal transformation means comprises a series of lights each of which is illuminated in response to the detection of a preselected opacity.

6. The system of claim 5 wherein the signal transformation means comprises a series of light emitting diodes.

7. The system of claim 1 wherein the fluid to be analyzed is an oil/water emulsion, wherein the signal produced by the opacity detection means is electrical and varies depending on the API gravity of the oil, and wherein the system further comprises:
means for recalibrating the system to operate in oils having different API gravities.

8. The system of claim 1 wherein the preselected opacities to which the signals produced by the signal differentiation means correspond are selected to correspond to different levels of water content in the fluid, whereby a difference in opacity indicates a difference in water content in the fluid.

9. The system of claim 8 wherein the temperature calibration means is accomplished automatically.

10. The system of claim 8 wherein the opacity detection means comprises a source of infrared light and means for receiving the infrared light.

11. The system of claim 10 wherein the opacity detection means comprises an infrared light emitting diode and a phototransistor .

12. The system of claim 8 wherein the signal transformation means comprises a series of lights each of which is illuminated in response to the detection of a preselected opacity.

13. The system of claim 12 wherein the signal transformation means comprises a series of light emitting diodes.

14. The system of claim 8 wherein the fluid to be analyzed is an oil/water emulsion, wherein the signal produced in response to the opacity detection means is electrical and varies depending on the API gravity of the oil, and wherein the system further comprises:
means for recalibrating the system to operate in oils having different API gravities.

15. A fluid analysis system, comprising:
opacity detection means for detecting the opacity of the fluid and for producing a signal indicative of the opacity of the fluid;
signal differentiation means for receiving the signal produced by the opacity detection means and in response thereto producing one of a plurality of signals, each such signal corresponding to a different one of a plurality of preselected opacities, wherein each of the preselected opacities is selected to correspond to a different one of a plurality of preselected fluid types; and
means for transforming the signals from the opacity detection means into a humanly perceivable form.

16. The system of claim 15 wherein the opacity detection means comprises a source of infrared light and means for receiving the infrared light.

17. The system of claim 16 wherein the opacity detection means comprises an infrared light emitting diode and a phototransistor.

18. The system of claim 15 wherein the signal transformation means comprises a series of lights each of which is illuminated in response to the detection of a preselected opacity.

19. The system of claim 18 wherein the signal display means comprises a series of light emitting diodes.

20. The system of claim 15 wherein the fluid types are different types of petroleum products.

21. The system of claim 20 wherein the fluid types are crude oil, light oil, and distillate.

22. The system of claim 15 wherein the fluid types include crude oil, light oil and distillate.

23. A fluid analysis system, comprising:
opacity detection means for detecting the opacity of the fluid and for producing a signal indicative of the opacity of the fluid;
conductivity sensing means for sensing if the fluid is electrically conductive and for producing a signal indicative of the conductivity of the fluid;
signal differentiation means for receiving the signals produced by the opacity detection means and the conductivity sensing means and in response thereto producing one of a plurality of signals, each such signal corresponding to a different one of a plurality of types of fluids, which fluid types comprise conductive and non-conductive fluids having different selected opacities; and
means for transforming the signals produced by the signal differentiation means into a humanly perceivable form.

24. The system of claim 23 wherein the opacity detection means comprises a source of infrared light and means for receiving the infrared light.

25. The system of claim 24 wherein the opacity detection means comprises an infrared light emitting diode and a phototransistor.

26. The system of claim 23 wherein the signal transformation means comprises a series of lights each of which is illuminated in response to the detection of a different fluid.

27. The system of claim 26 wherein the signal transformation means comprises a series of light emitting diodes.

28. The system of claim 23 wherein the fluid types comprise crude oil, light oil, distillate, clear water, muddy water and air.

29. A system for measuring the water content in an oil/water emulsion comprising:
opacity detection means for detecting the opacity of the fluid and for producing a signal indicative of the opacity of the fluid;
signal differentiation means for receiving the signal produced by the opacity detection means and in response thereto producing one of a plurality of signals, each such signal corresponding to a different one of a plurality of preselected opacities, each of which preselected opacities is selected to correspond to a different level of water content; and
means for transforming the signals from the signal differentiation means into a humanly perceivable form.

30. The system of claim 29 further comprising:
mean for recalibrating the system in response to changes in temperature.

31. The system of claim 30 wherein the temperature recalibration means is accomplished automatically.

32. The system of claim 30 further comprising:
means for recalibrating the system to operate in oils having different API gravities.

33. The system of claim 29 further comprising:
means for recalibrating the system to operate in oils having different API gravities.

* * * * *

UNITED STATES PATENT AND TRADEMARK OFFICE
CERTIFICATE OF CORRECTION

PATENT NO. : 5,105,085
DATED : April 14, 1992
INVENTOR(S) : McGuire, et al

It is certified that error appears in the above-indentified patent and that said Letters Patent is hereby corrected as shown below:

Column 1, line 34, the word "calibrating" should be --recalibrating--.

Column 2, line 55, a comma should be inserted after the word "components."

Column 2, line 68, the word "analyses" should be --analyzes--.

Column 3, line 11, quotation marks should be inserted after the word "LED1."

Column 3, line 14, the fraction "1/4" should be --1/2--.

Column 3, line 44, the word "a" at the end of the line should be --an--.

Column 5, line 59, the word "a" should be --an--.

Column 11, line 6, the number 3 should be inserted after the word "claim."

UNITED STATES PATENT AND TRADEMARK OFFICE
CERTIFICATE OF CORRECTION

PATENT NO. : 5,105,085
DATED : April 14, 1992
INVENTOR(S) : McGuire, et al

It is certified that error appears in the above-indentified patent and that said Letters Patent is hereby corrected as shown below:

Column 12, line 58, the word "mean" should be --means--.

Signed and Sealed this

Twelfth Day of October, 1993

Attest:

BRUCE LEHMAN

Attesting Officer      Commissioner of Patents and Trademarks